United States Patent [19]
Zindler

[11] 3,971,463
[45] July 27, 1976

[54] PROGRESSIVELY ENGAGED CENTRIFUGAL CLUTCH

[76] Inventor: Hugh A. Zindler, 11407 Cedar Creek Road, Cedarburg, Wis. 53012

[22] Filed: May 14, 1975

[21] Appl. No.: 577,336

[52] U.S. Cl. .................. 192/105 BA; 192/105 CD; 192/52; 192/54
[51] Int. Cl.² ........................................ F16D 43/14
[58] Field of Search .............. 192/105 BA, 105 CD, 192/103 B, 52, 54

[56] References Cited
UNITED STATES PATENTS

| | | | |
|---|---|---|---|
| 1,823,074 | 9/1931 | Wersall | 192/105 BA |
| 2,452,111 | 10/1948 | Eaton | 192/105 BA |
| 2,691,437 | 10/1954 | Dalrymple | 192/105 BA |
| 2,942,711 | 6/1960 | Zindler | 192/105 BA |

*Primary Examiner*—Benjamin W. Wyche
*Attorney, Agent, or Firm*—Andrus, Sceales, Starke & Sawall

[57] ABSTRACT

A centrifugal clutch is disclosed wherein the driving member is provided with multiple projections for engagement with each clutch shoe. The driving member projections are successively engageable with the shoe with increasing increments of speed to provide for progressively increasing torque transmitting capability up to the maximum torque load of the clutch.

19 Claims, 16 Drawing Figures

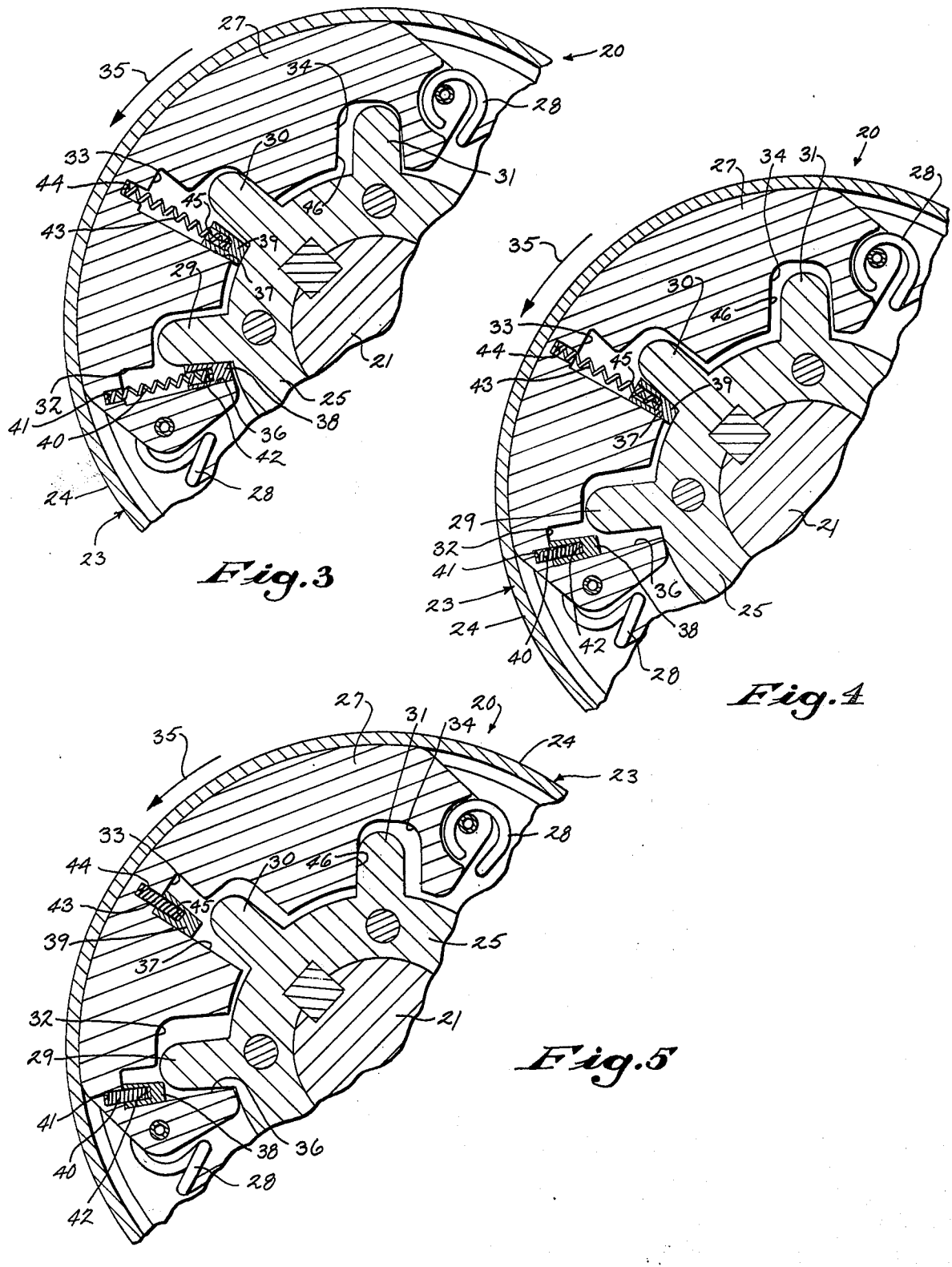

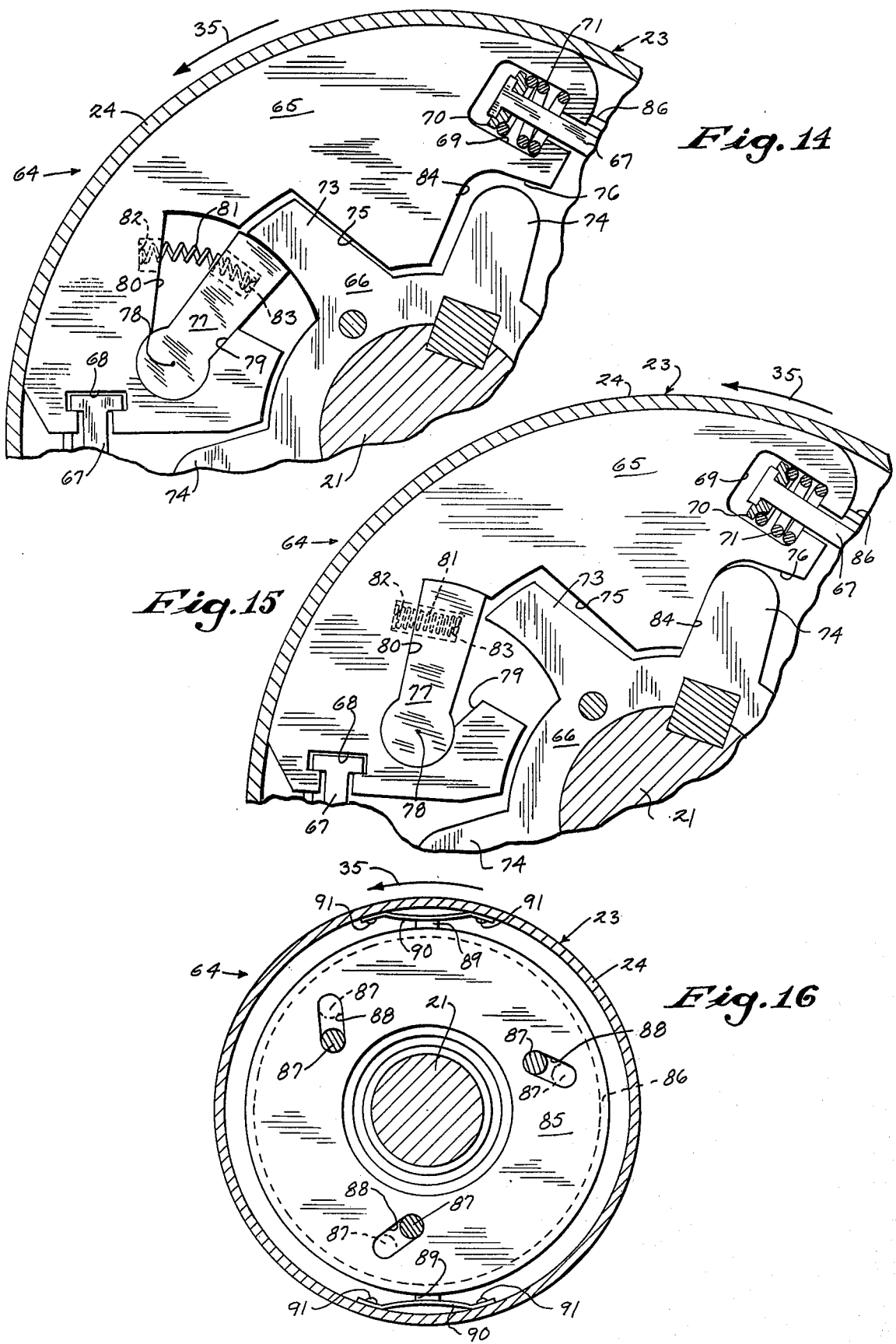

3,971,463

PROGRESSIVELY ENGAGED CENTRIFUGAL CLUTCH

BACKGROUND OF THE INVENTION

This invention relates to a centrifugal clutch having a relatively high torque transmitting capability which is progressively engageable to provide a smooth and gradual load pick up characteristic.

A designer of centrifugal clutches is frequently on the horns of a dilemma. For a clutch application requiring a given torque transmitting capability, he can select a relatively small, inexpensive high torque unit but which is characterized by relatively rapid and harsh engagement frequently accompanied by chatter and extreme vibration noise upon engagement. Alternatively, he can select a relatively large, more expensive low torque unit characterized by a relatively soft, smooth and gradual engagement. If for the particular clutch application, the expense and/or size of a low torque centrifugal clutch unit is inappropriate, and the rapid and harsh engagement characteristic of a high torque centrifugal clutch unit is also inappropriate, the designer may have to rule out a centrifugal clutch unit altogether and resort, at perhaps substantially greater expense and complication, to some other form of clutch device.

Thus, it is generally an object of this invention to provide a centrifugal clutch having a relatively high torque transmitting capability with a relatively soft, smooth and gradual engagement, and which can be made available in a relatively small unit at reasonable cost.

SUMMARY OF THE INVENTION

The invention relates to a centrifugal clutch for transmitting torque between an inner driving member and an outer driven member. A plurality of circumferentially spaced shoes are interposed between the driving and driven members. Spring means connect the ends of the adjacent shoes and bias the shoes inwardly onto the driving member and out of engagement with the driven member. The shoes are movable against the bias of the spring means in response to centrifugal force to effect a driving engagement with the driven member. A plurality of circumferentially spaced projections extend outwardly from the driving member for engagement with each of the shoes. The projections corresponding to each shoe are successively engageable with the shoe with increasing increments to speed to provide for progressively increasing torque transmitting capability up to the maximum torque load of the clutch.

DESCRIPTION OF THE DRAWING FIGURES

The drawings presented herewith illustrate the best mode presently contemplated for the invention and are described hereinafter.

In the drawings:

FIG. 3 is a partial sectional elevation generally similar to that of FIG. 1 and shows the clutch shoes after making initial engagement with the drum to provide for a low torque transmitting capability;

FIG. 4 is a view similar to that of FIG. 3 and shows a progressive stage of clutch engagement wherein the clutch has reached an intermediate torque transmitting capability;

FIG. 5 is a view similar to that of FIG. 3 and shows the final stage of engagement for the clutch of FIG. 1 wherein the clutch has reached the high or maximum torque transmitting capability;

FIG. 14 is a partial elevational view generally similar to that of FIG. 11 and shows the clutch shoes after making initial engagement with the drum providing for a low torque transmitting capability;

FIG. 15 is a partial elevational view generally similar to that of FIG. 14 and shows the final engagement position for the clutch of FIG. 11 wherein the clutch has reached the high or maximum torque transmitting capability; and FIG. 16 is a sectional view taken generally on line 16—16 of FIG. 12.

DESCRIPTION OF THE ILLUSTRATED EMBODIMENTS

Figure 1:
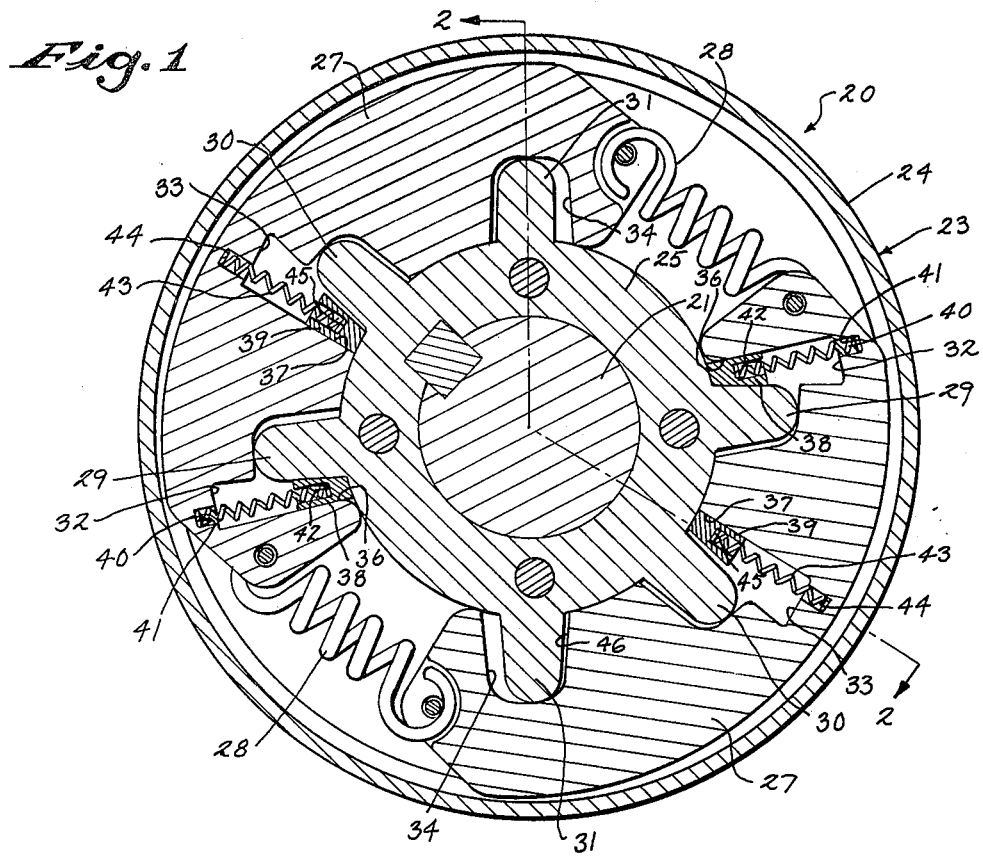
FIG. 1 is a sectional elevation of the centrifugal clutch of this invention showing the clutch in the disengaged condition.
Figure 2:
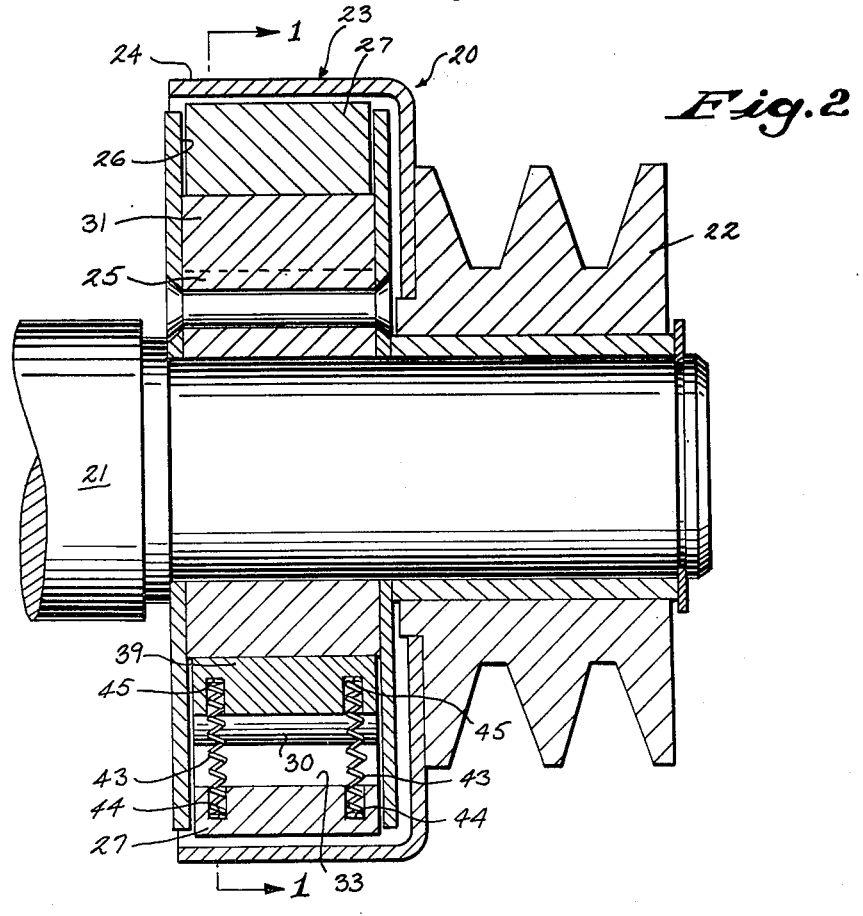
FIG. 2 is a sectional view taken generally on line 2—2 of FIG. 1.

Referring to FIGS. 1 and 2 of the drawings, the centrifugal clutch 20 is interposed between the shaft 21 of a driving member, not shown, and a driven member shown in the form of a pulley 22. The pulley 22 is piloted on the end of the shaft 21 and includes the drum 23 provided with a cylindrical flange 24.

Within the drum 23, a hub 25 is keyed onto the shaft 21 and is radially aligned with the flange 24. The hub 25 is provided with a peripheral recess 26 for axially confining the segmental clutch shoes 27 disposed therein. The clutch 20 includes a pair of generally identical, diametrically opposed clutch shoes 27 having their adjacently disposed ends connected by tension springs 28 to effect and maintain a disengagement of the shoes from the drum flange 24 under the conditions as generally depicted in FIG. 1.

The hub 25 on shaft 21 is provided with a series of three circumferentially spaced lobe projections 29, 30 and 31 corresponding to each clutch shoe 27, and the lobe projections for one shoe are generally diametrically opposed from the corresponding lobe projections of the other shoe. The respective lobe projections 29, 30 and 31 corresponding to each shoe 27 extend outwardly into substantially oversized recesses 32, 33 and 34 along the inner periphery of the respective clutch shoes.

The clutch 20 of FIG. 1 is designed for counterclockwise operation as indicated by the arrows 35 in FIGS. 3 through 5. The leading surfaces 36 and 37 of the respective recesses 32 and 33 extend generally radially and outwardly substantially beyond the corresponding lobe projections 29 and 30. Wedge members 38 and 39 are disposed in the recesses 32 and 33, respectively, between the leading surfaces 36 and 37 and the corresponding lobes 29 and 30. The wedge member 38 is biased toward the hub 25 by a pair of axially spaced compression springs 40 which extend between corresponding opposed seats 41 and 42 provided in the shoes 27 and wedge member 38, respectively. The wedge member 39 is similarly biased toward the hub 25 by the axially spaced springs 43 seated in correspondingly opposed seats 44 and 45. The leading surface 46 of the trailing recess 34 also extends generally radially.

The centrifugal clutch 20 is intended for use in applications requiring relatively high torque transmission and is engaged gradually or in progressive stages as generally shown in FIGS. 3 through 5. Upon reaching a given speed in response to the rotation of the drive shaft 21, the shoes 27 move generally radially outward against the bias of tension springs 28 to engage the inner surface of drum flange 24 in response to centrifugal force. The drive torque is initially transmitted through the leading lobe projection 29 and corresponding wedge member 38 adjacent to the leading end of the shoes 27 as generally shown in FIG. 3. In this mode of clutch engagement, the resultant driving force acting on the shoes 27 tends to pivot the trailing end of the shoes outwardly and provides what is considered a "soft" action of relatively low torque transmission capability permitting slippage in the event of possible overload. At this stage, it will be noted that the intermediate and trailing lobe projections 30 and 31 of the hub 25 remain ineffective.

In the next succeeding stage for engagement of clutch 20 and at a speed some increment higher than initially required to move the shoes 27 into engagement with the drum flange 24, the wedge member 38 moves outwardly against the bias of the compression spring 40 in response to centrifugal force and completely clears the corresponding lobe projection 29 of the drive hub 25. As a result, lobe projection 29 is now rendered ineffective to further transmit a driving torque and the load is now transferred to the intermediate lobe projection 30 which transmits the drive torque through the corresponding wedge member 39 generally centrally of the shoes 27 as generally shown in FIG. 4. At this stage of progressive clutch engagement, the clutch is capable of substantially higher torque transmission than was attained through engagement of the leading lobe projection 29. At this stage, too, it will be noted that the trailing lobe projections 31 continues to remain ineffective.

After a still further increased increment in speed, to provide for a third and final stage of engagement for the clutch 20, the wedge member 39 will move outwardly against the bias of the compression spring 43 in response to centrifugal force to clear its corresponding lobe projection 30 and thereby render the latter ineffective and thus allow the drive hub 25 to move relative to the shoes 27 to bring the trailing lobe projection 31 into torque transmitting contact with the shoe surface 46 generally adjacent to the trailing end of the shoes as generally shown in FIG. 5. The clutch 20 as shown in FIG. 5 is fully engaged. In this mode of clutch engagement, the driving force acting on the shoes 27 provides a force component that reinforces the centrifugal force and the clutch 20 has attained its highest torque transmitting capability. At speeds maintaining the lobe projection 31 in contact with the shoe surface 46, centrifugal force will maintain the wedge members 38 and 39 outwardly clear of their corresponding lobe projections 29 and 30 so that the latter remain drivingly ineffective.

If the wedge members 38 and 39, as shown in the embodiment of FIGS. 1 through 5, are generally similar in weight and mass, the spring rate for the spring 43 must be higher than for the spring 40 to provide for their response to centrifugal force in proper sequence. The specific spring rates selected for the springs 40 and 43 along with the characteristics of other elements of clutch 20 must be tailored for the particular load and application for the clutch.

Figure 6:
FIG. 6 shows an elevational view with parts broken away and sectioned and shows a further embodiment of centrifugal clutch wherein clutch engagement is effected in stages.
Figure 7:
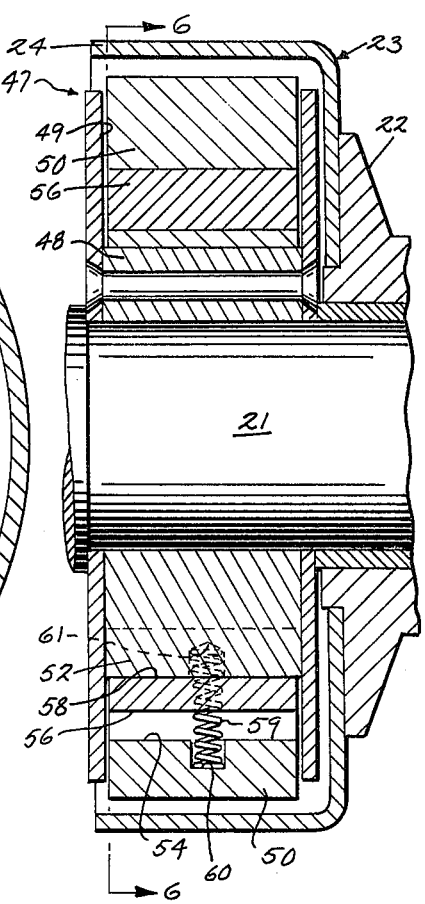
FIG. 7 is a sectional view taken generally on line 7—7 of FIG. 6.

Turning now to the embodiment of FIGS. 6 through 10, the clutch 47 is shown interposed between the drive shaft 21 and the cylindrical flange 24 of the driven drum 23. For the clutch 47, the shaft 21 carries the keyed hub 48 aligned radially with the drum flange 24. The hub 48 includes the peripheral recess 49 wherein a pair of generally identical, diametrically opposed segmental clutch shoes 50 are axially confined. Tension springs 51 connect the adjacently disposed ends of the shoes 50 to effect and maintain a disengagement of the shoes from the drum flange 24 under the conditions as depicted in FIG. 6.

According to the embodiment of FIGS. 6 through 10, the hub 48 is provided with a pair of circumferentially spaced lobe projections 52 and 53 corresponding to each clutch shoe 50. The lobe projections 52 and 53 for the one shoe 50 are generally diametrically opposed from the corresponding lobe projections for the other shoe. Relative to the clutch shoes 50, the lobe projection 52 is substantially removed from center in the direction of the leading end of the shoes, and the lobe projection 53 is generally adjacent to the trailing end. The lobe projections 52 and 53 extend outwardly into corresponding recesses 54 and 55 provided on the inner periphery of the clutch shoes 50.

A cam 56 is pivoted at 57 generally adjacent to the leading end of each shoe 50 and projects away from the leading end of the shoe into the recess 54. Intermediate its length, the cam 56 is provided with an inwardly facing recess 58 engageable with the hub lobe projection 52. The cam 56 is biased to make engagement with the lobe projection 52 by the compression spring 59 extending between the opposed seats 60 and 61 provided in the shoe 50 and the cam 56, respectively, as illustrated in FIG. 6.

Figure 9:
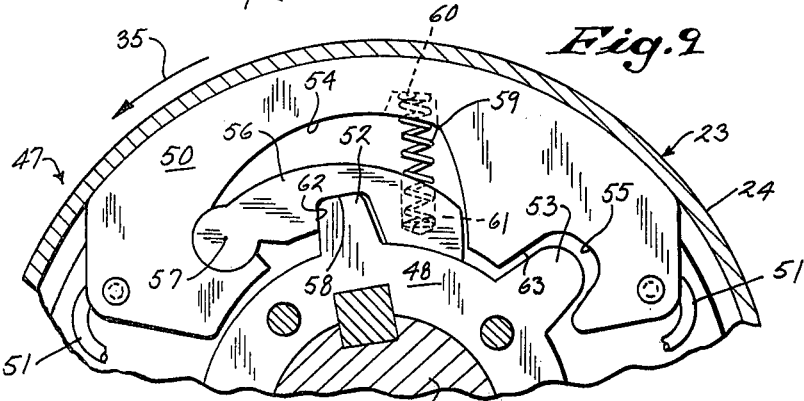
FIG. 9 is a partial elevational view generally similar to that of FIG. 6 and shows the clutch shoes after making initial engagement with the drum providing for a low torque transmitting capability.
Figure 10:
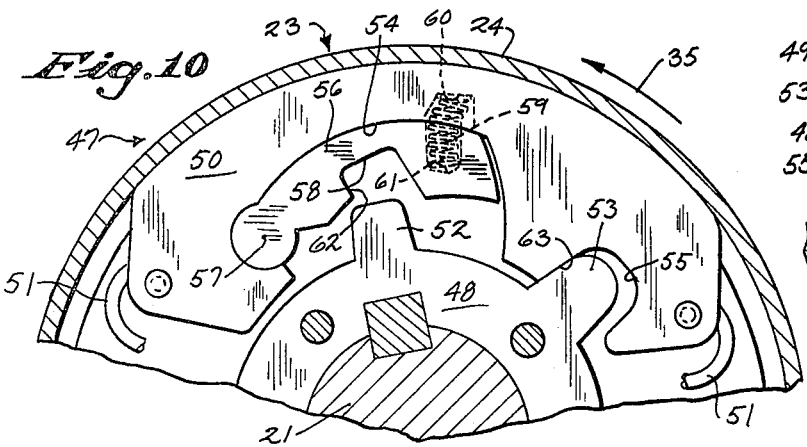
FIG. 10 is a partial elevational view generally similar to that of FIG. 9 and shows the final engagement position for the clutch of FIG. 6 wherein the clutch has reached the high or maximum torque transmitting capability.
Figure 8:
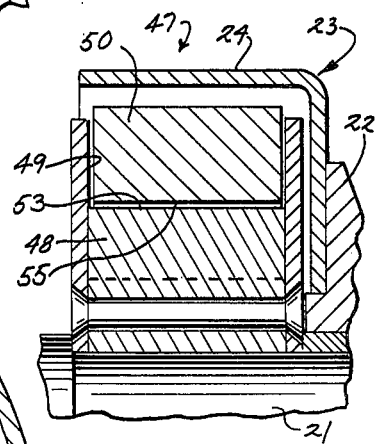
FIG. 8 is a sectional view taken generally on line 8—8 of FIG. 6.

The clutch 47 is engageable gradually in two stages as generally shown in FIGS. 9 and 10. Upon attainment of a given speed with rotation of the drive shaft 21, the shoes 50 will move generally radially outward against the bias of springs 51 to engage the drum flange 24 in response to centrifugal force generally as shown in FIG. 9. At this stage, the driving torque is being transmitted through the leading lobe projection 52 which bears against the leading surface 62 of the cam recess 58. The resultant force on the shoes 50 at the cam pivot 57 adjacent the leading end of the shoes tend to pivot the trailing end of the shoes outwardly to provide a relatively low torque transmission capability and permit some slippage in the event of overload. The trailing lobe projection 53 at this stage remains ineffective.

With a given increased increment in speed imposed on the clutch 47, the cam 56 is pivoted outwardly against the bias of spring 59 in response to centrifugal force to effect a disengagement of the cam with the lobe projection 52 of the drive hub 48. The disengagement between the cam 56 and lobe projection 52 permits the drive hub 48 to rotate relative to the clutch shoes 50 to bring the lobe projection 53 into torque transmitting engagement with the leading surface 63 of the shoe recess 55 as generally shown in FIG. 10. At speeds maintaining the lobe projections 53 in contact with the shoe surfaces 63, the clutch 47 is fully engaged and capable of transmitting a maximum torque load. At such speeds, centrifugal force will maintain the cam 56 clear of the lobe projection 52 so that the latter remains drivingly ineffective.

Figure 11:
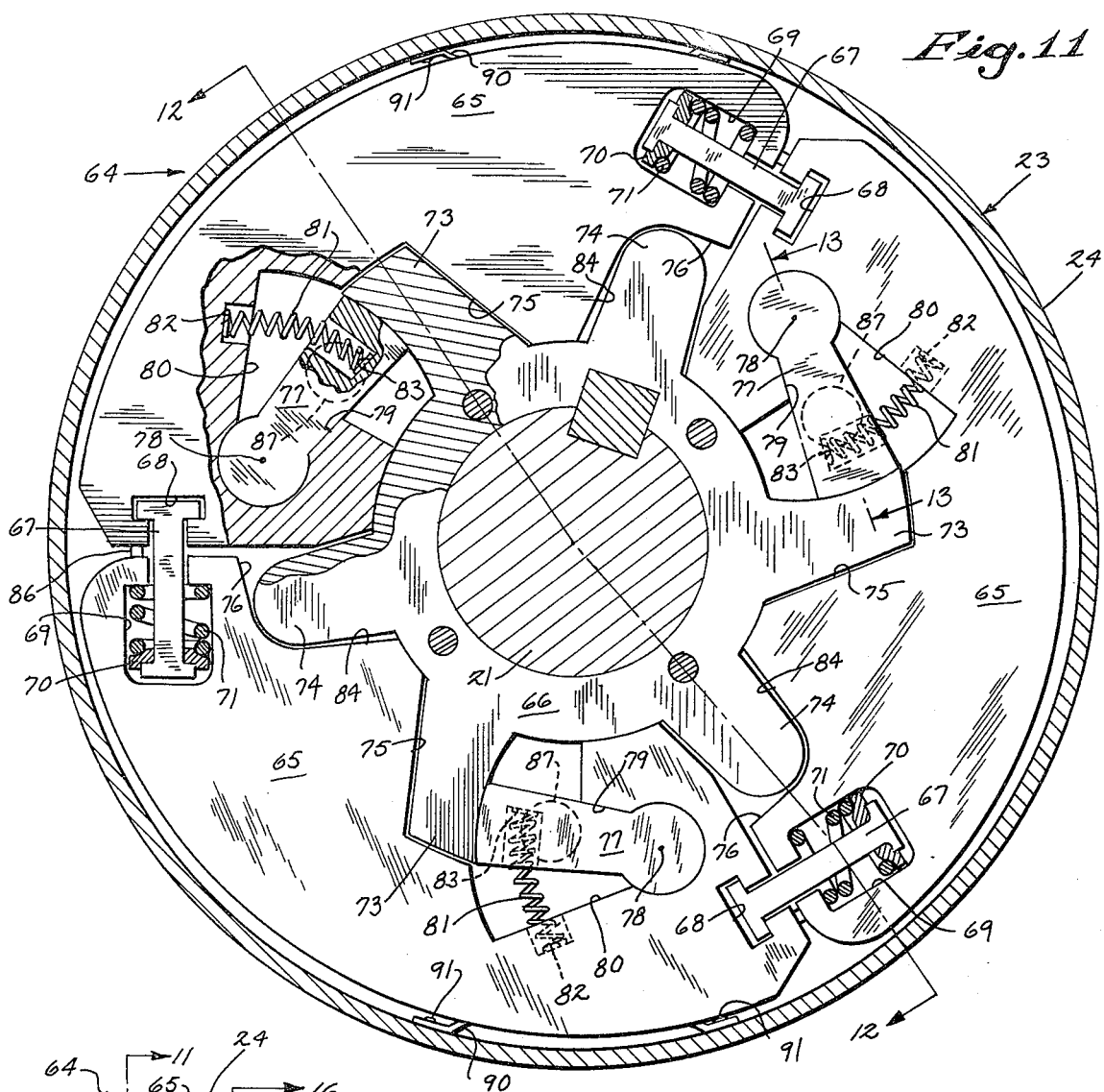
FIG. 11 is an elevational view with parts broken away and sectioned and shows a still further embodiment of centrifugal clutch wherein engagement is effected in stages.
Figure 12:
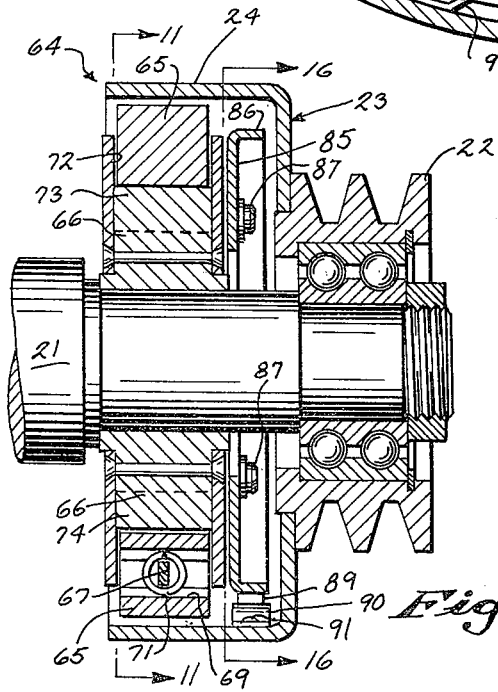
FIG. 12 is a reduced sectional view taken generally on line 12—12 of FIG. 11.
Figure 13:
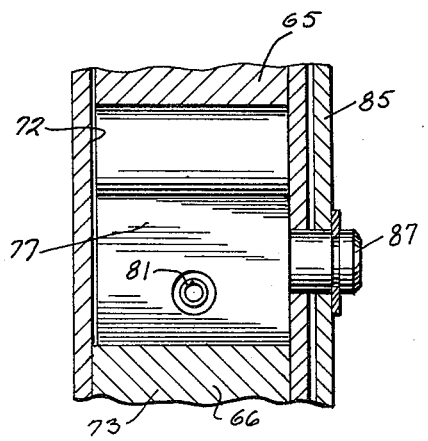
FIG. 13 is a sectional view taken generally on line 13—13 of FIG. 11.

In the embodiment of FIGS. 11 through 16, the clutch 64 includes an arrangement of three segmental shoes 65 interposed between and aligned generally radially with the drive hub 66 keyed on shaft 21 and the cylindrical drum flange 24 of driven pulley 22. The adjacent ends of the clutch shoes 65 are connected by a spring tie inclusive of a generally I-shaped rod 67, one end of which is received in a T-shaped slot 68 in the leading end of the respective shoes. The opposite end of rod 67 is disposed in a spring cavity 69 provided in the trailing end of the respective shoes 65 generally opposed from the slot 68 of the adjacent shoe. The end of the I-shaped rod 67 in the cavity 69 supports a spring seat 70 and a compression spring 71 is coiled about the rod and bears respectively against the seat and the opposed end wall of the cavity to effect and maintain the shoes 65 in close proximity to the hub 66 and out of engagement with the drum flange 24 as depicted in FIG. 11. The respective clutch shoes 65 are axially confined within the peripheral hub recess 72.

The drive hub 66 is provided with a pair of circumferentially spaced lobe projections 73 and 74 in each 120° sector of the hub to correspond with the disposition of the several shoes 65. The lobe projections 73 and 74 extend outwardly into corresponding recesses 75 and 76 in the shoes 65. A cam 77 is pivoted at 78 generally adjacent to the leading end of each shoe 65 and projects into the respective recesses 75 with the free end of the cam being engageable by the leading surface of the lobe projection 73. The cams 77 are pivotal between the angularly spaced surfaces 79 and 80 of the recesses 75 from a position engageable with the corresponding lobe projection 73 to a position out of engagement with the lobe projection. A compression spring 81 corresponding to each shoe 65 is disposed between opposed seats 82 and 83 in the shoe and the cam 77, respectively, and biases the cam toward the recess surface 79 for engagement with the lobe projection 73. Under circumstances further described hereinafter, the lobe projections 74 are adapted to engage with the surface 84 of the respective recesses 76 at the trailing end of the shoes 65.

The clutch 64 further includes the plate 85 which is piloted on the shaft 21 inside the drum 23. The plate 85 is provided with a cylindrical flange 86 and is carried by the several cams 77 each of which has an axially projecting pin 87 that extends through a slot 88 in the plate. When the clutch 64 is disengaged and the cams 77 are biased against the recess surfaces 79 as generally shown in FIG. 11, the pins 87 are disposed at the inner ends of the respective slots 88 as shown in solid lines in FIG. 16. The pins 87 assume the dotted line positions at the outer end of slots 88 in a manner to be described hereinafter.

The cylindrical flange 86 of plate 85 is engageable with a pair of opposed friction or brake blocks 89 as perhaps best shown in FIG. 16. The respective blocks 89 are supported intermediate the length of the leaf springs 90 which have their circumferentially spaced ends secured by fasteners 91 to the cylindrical flange 24 of the brake drum 23. The springs 90 normally bias the blocks 89 inwardly into contact with the cylindrical flange 86 of the plate 85.

Similarly to clutch 47, the clutch 64 is gradually engageable in two stages. Upon attaining a given speed with rotation of the drive shaft 21, the clutch shoes 65 will move generally radially outward against the bias of springs 71 and the resistance imposed by the friction blocks 89 on the plate 85 to effect an engagement with the drum flange 24 in response to centrifugal force as generally shown in FIG. 14. Prior to the time the clutch shoes 65 move outwardly, the drive hub 66 along with the shoes and the plate 85 all rotate together generally as a unit. When the shoes 65 move outwardly in response to centrifugal force, the cams 77 are forced to move correspondingly. As the cams 77 move with the shoes 65, the cam pins 87 must move a short distance relative to the slots 88 in the plate 85 and thus the plate is forced to rotate correspondingly relative to the shoes. During first stage clutch engagement, the disposition of cam pins 87 in the slots 88 locks the shoes 65 and plate 85 together generally as a unit.

At first stage engagement of the clutch shoes 65 with the drum flange 24, the driving torque is being transmitted through the leading lobe projection 73 bearing against the free end of cam 77. The resultant force on the shoes 65 at the cam pivot 78 generally adjacent to the leading end of the respective shoes tend to pivot the trailing end of the shoes outwardly for relatively low torque transmission capability and so permit slippage in the event of overload. At this stage, the trailing lobe projections 74 remain ineffective.

To get out of first stage engagement and into second stage engagement, the respective cams 77 must pivot outwardly clear of the leading lobe projection 73. Pivotal movement of the cams 77 outwardly is not only impeded by the bias of springs 81, but also by the frictional resistance imposed by the friction blocks 89 on the plate 85. When the frictional resistance of the blocks 89 on plate 85 is selected to be determinative of the quantum of centrifugal force required to effect first stage disengagement of the cams 77, the increment of increased speed must be adequate to move the leaf springs 90 along with the friction blocks 89 radially outwardly in response to centrifugal force to remove the friction forces on the plate. With the friction forces on the plate 85 removed, the plate is free to rotate in response to pivotal movement of the cams 77. When the cams 77 pivot outwardly in response to centrifugal force, the plate 85 is rotated relative to the shoes 65 as the cam pins 87 move outwardly to the dotted line position in the slots 88 as shown in FIG. 16. As the cams 77 move to clear the leading lobe projection 73 on the drive hub 66, the hub is able to rotate relative to the shoes 65 to bring the trailing lobe projections 74 into torque transmitting engagement with the corresponding recess surfaces 84 at the trailing end of the shoes. At speeds maintaining the lobe projections 74 in contact with recess surfaces 84 of the respective shoes 65, the clutch 64 is fully engaged and capable of transmitting a maximum torque load while centrifugal force maintains the cams 77 clear of the lobe projection 73.

The frictional forces imposed on the clutch 64 by the plate 85 may be considered as supplementing the end load driven through the clutch. Hence, in the embodiment of FIGS. 11–16, the imposed end load on clutch 64 is controlling for the shift from low torque transmitting engagement to the higher torque transmitting engagement.

The invention thus provides a centrifugal clutch of relatively small size having a relatively high torque transmitting capability and yet engageable with smoothness and gradual load pick up chracteristic of a much larger conventional centrifugal clutch.

Various modes of carrying out the invention are contemplated as being within the scope of the following claims particularly pointing out and distinctly claiming the subject matter which is regarded as the invention.

I claim:

1. In a centrifugal clutch for transmitting torque between an inner driving member and an outer driven member, a plurality of circumferentially spaced shoes interposed between the driving and driven members, spring means connecting the ends of adjacent shoes and biasing the shoes inwardly onto the driving member and out of engagement with the driven member, said shoes being movable against the bias of said spring means in response to centrifugal force to effect a driving engagement with the driven member, a plurality of circumferentially spaced projections extending outwardly from the driving member for engagement with each shoe, and means between the driving member and each shoe and providing for successive engagement between each said shoe and the corresponding projections with increasing increments of speed, the successive engagement between said shoes and the corresponding projections providing for progressively increasing torque transmitting capability up to the maximum torque load of the clutch.

2. The structure as set forth in claim 1 wherein the means between the driving member and each shoe and providing for successive engagement between each said shoe and the corresponding projections with increasing increments of speed comprise cam means associated with each clutch shoe and engageable with at least the leading driving member projection, said cam means being movable in response to centrifugal force to disengage from the corresponding driving member projection to render said projection ineffective and provide for driving engagement by the next succeeding driving member projection.

3. The structure as set forth in claim 2 wherein friction means are disposed between the cam means and the driven member and serve to resist movement of the cam means, said friction means being releasable in response to centrifugal force at a speed greater than otherwise required to move the cam means to effect a disengagement from the corresponding driving member projections.

4. The structure as set forth in claim 2 wherein the cam means comprises a wedge member which is biased into a position of engagement with the leading driving member projection and said wedge member is movable to a position out of engagement with said leading projection in response to centrifugal force to render the leading projection ineffective.

5. The structure as set forth in claim 2 wherein the cam means includes a cam member pivotally connected adjacent to the leading end of each shoe.

6. The structure as set forth in claim 5 wherein the cam member is biased into a position of engagement with the leading driving member projection and said cam member is pivotal to a position out of engagement with said leading projection in response to centrifugal force to render the leading projection ineffective.

7. The structure as set forth in claim 6 wherein friction means are disposed between the cam members and the driven member and serve to resist movement of the cam members, said friction means being releasable in response to centrifugal force at a speed greater than otherwise required to pivotally move the cam members and hence control the disengagement of the cam members from the corresponding driving member projections.

8. The structure as set forth in claim 1 wherein the spring means connecting the ends of adjacent shoes comprise rod means interlocking with one of the adjacent shoes and projecting into a cavity provided in the other of said shoes, and a coil spring disposed on said rod means in said cavity and bearing respectively on the rod means and the wall of the cavity to bias the adjacent shoes toward each other.

9. The structure as set forth in claim 1 wherein the driving member is provided with a pair of projections for engagement with each shoe to provide for a smooth and gradual pick up of the load in two stages of increasing torque transmitting capability.

10. The structure as set forth in claim 1 wherein the driving member is provided with three projections for engagement with each shoe to provide for a smooth and gradual pick up of the load in three stages of increasing torque transmitting capability.

11. The structure as set forth in claim 1 wherein a pair of driving member projections extend outwardly into corresponding recesses provided in each shoe, one of said recesses being disposed adjacent to the trailing end of each shoe and having a thrust surface and the other of said recesses being disposed intermediate the leading and trailing end of each shoe, a cam member pivotally supported adjacent to the leading end of each shoe and projecting aftward into the intermediate recesses, and spring means biasing the cam members into engagement with the leading driving member projections to render said leading projections effective to transmit a relatively low torque capability through the cam members and the leading end of the shoes, said cam members being pivotally movable within the corresponding recesses in response to centrifugal force at a generally given speed to disengage from said leading projections and thereby render said driving member free to rotate relative to the shoes to effect an engagement of the trailing driving member projections with the corresponding thrust surfaces in the trailing recesses to provide for maximum torque transmitting capability at speeds above said given speed.

12. The structure as set forth in claim 11 wherein the spring means biasing the cam members into engagement with the leading driving member projections are compression springs respectively seated in the cam member and the shoe.

13. The structure as set forth in claim 11 wherein the cam members are provided with an inwardly opening recess engageable over the end extremity of the leading driving member projections.

14. The structure as set forth in claim 11 wherein the end extremities of the cam members are engageable with the leading surface of the leading driving member projection.

15. The structure as set forth in claim 1 wherein three circumferentially spaced shoes are disposed between the driving and driven members and a pair of driving member projections extend outwardly into corresponding recesses provided in each shoe, one of said recesses being disposed adjacent to the trailing end of each shoe and having a thrust surface and the other of said recesses being disposed intermediate the length of each shoe, a cam member pivotally supported adjacent to the leading end of each shoe and projecting aftward into the intermediate recesses, and spring means biasing the cam members into engagement with the leading driving member projections to render said leading projections effective to transmit a relatively low torque capability through the cam members and the leading end of the respective shoes, said cam members being pivotally movable within the corresponding recesses in response to centrifugal force at a generally given speed to disengage from said leading projections and thereby render said driving member free to rotate relative to the shoes to effect an engagement between the trailing driving member projections and the corresponding thrust surfaces in the trailing recesses to provide for maximum torque transmitting capability at speeds above said given speed.

16. The structure as set forth in claim 15 wherein the spring means connecting the ends of adjacent shoes comprise rod means interlocking with one of the adjacent shoes and projecting into a cavity provided in the other of said shoes, and a coil spring disposed on said rod means in said cavity and bearing respectively on the rod means and the wall of the cavity to bias the adjacent shoes toward each other.

17. The structure as set forth in claim 15 wherein friction means are disposed between the cam members and the driven member and serve to resist movement of the cam members, said friction means being releasable in response to centrifugal force at a speed greater than otherwise required to pivotally move the cam members and hence control the disengagement of the cam members from the corresponding driving member projections.

18. The structure as set forth in claim 17 wherein the friction means comprise a plate member having a cylindrical flange, said plate member having corresponding recesses engageable by pin means projecting from the cam members to support the plate member, a plurality of friction blocks engageable with the flange of the plate member to resist pivotal movement of the cam members to effect a disengagement from corresponding driving member projections, and leaf springs mounted on the driven member and supporting each of said blocks, said spring supported blocks being movable out of engagement with said plate in response to centrifugal force at a speed greater than otherwise required to move the cam members to effect a disengagement from the corresponding driving member projections.

19. The structure as set forth in claim 1 wherein a series of three projections extend outwardly from the driving member into corresponding recesses provided in each shoe, said recesses being disposed adjacent to the leading end, adjacent to the trailing end and intermediate the leading and trailing ends of each shoe, wedge members disposed in the leading end and intermediate recesses between the driving member projections and the corresponding leading thrust surface of said recesses, and spring means biasing the wedge members into position for engagement by the corresponding driving member projections, said wedge member in the leading end recesses being initially engageable by the corresponding leading driving member projections to render said leading projections effective to transmit a relatively low torque capability through the shoes, said wedge member in the leading end recesses being movable against the bias of the corresponding spring means in response to centrifugal force at a generally given speed to disengage from said leading projections and thereby render said driving member free to rotate relative to the shoes to effect successive engagement of the intermediate driving member projections with the wedge members in the corresponding intermediate recesses to render said intermediate projections effective to transmit a higher torque capability through the shoes, said wedge member in the intermediate recesses being movable against the bias of the corresponding spring means in response to centrifugal force at a given higher increment of speed to disengage from said intermedite projections and thereby again render said driving member free to rotate relative to the shoes to effect further successive engagement of the trailing driving member projections with the thrust surface in the corresponding trailing end recesses of the shoes to render said trailing projections effective to transmit maximum torque capability through the clutch.

\* \* \* \* \*